Figure 1:
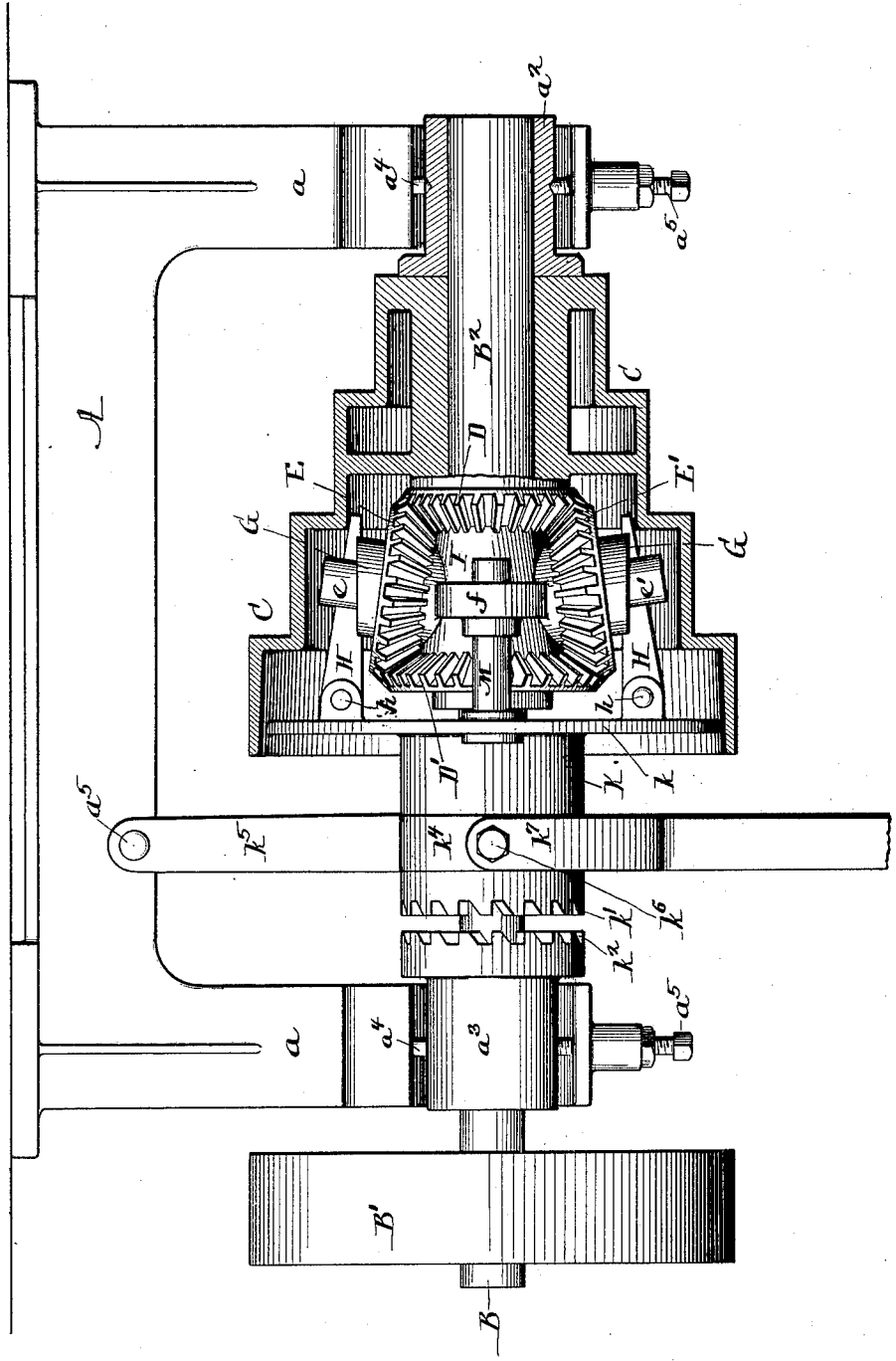

No. 657,056. Patented Aug. 28, 1900.
C. H. BLOMSTROM.
REVERSING GEAR MECHANISM.
(Application filed Feb. 26, 1900.)

(No Model.) 3 Sheets—Sheet 1.

Witnesses:
Fred Gerlach
Alberta Adamick

Inventor:
C. H. Blomstrom
By Prines & Fisher
his Attorneys.

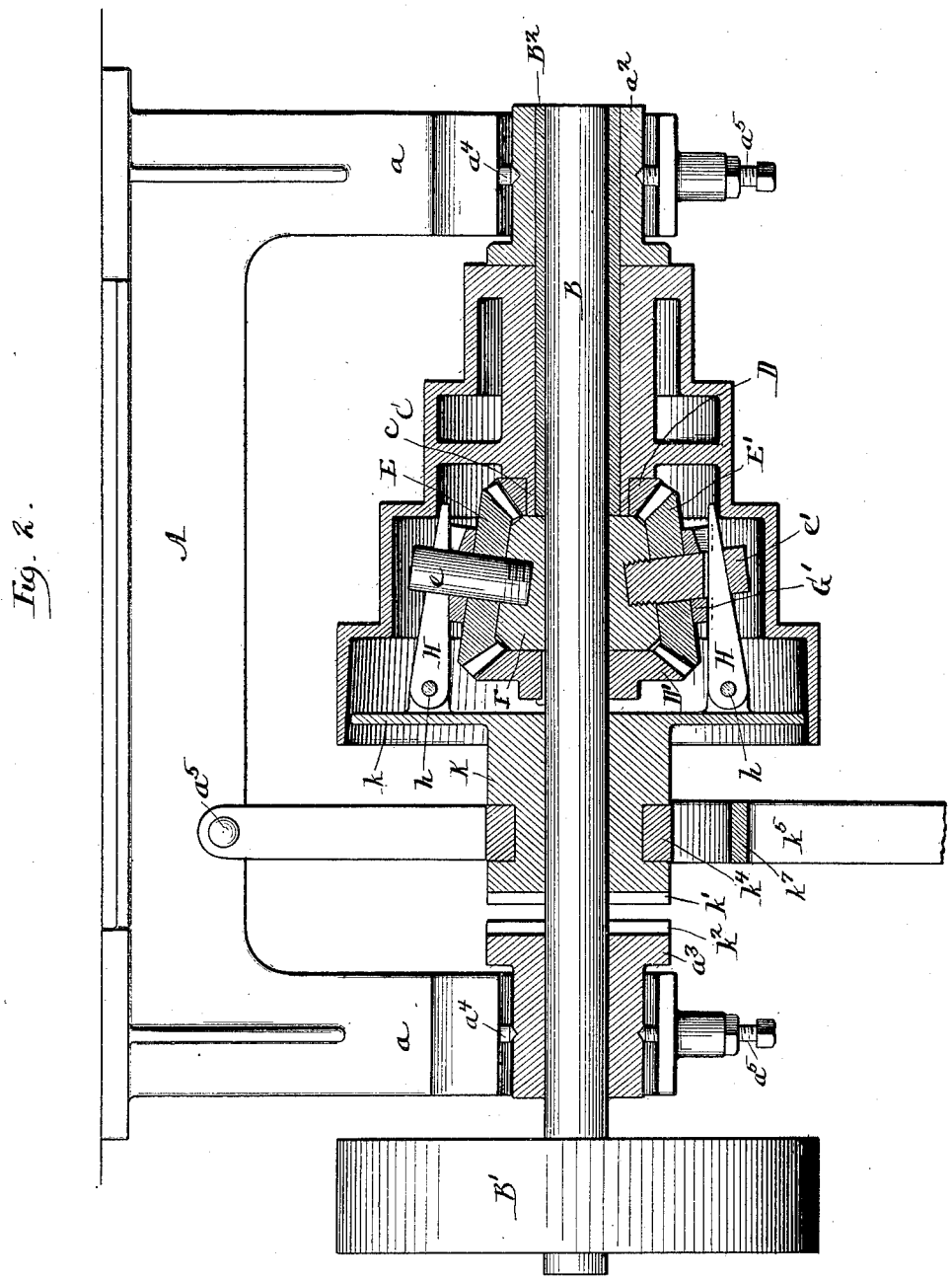

No. 657,056. Patented Aug. 28, 1900.
C. H. BLOMSTROM.
REVERSING GEAR MECHANISM.
(Application filed Feb. 26, 1900.)
(No Model.) 3 Sheets—Sheet 3.
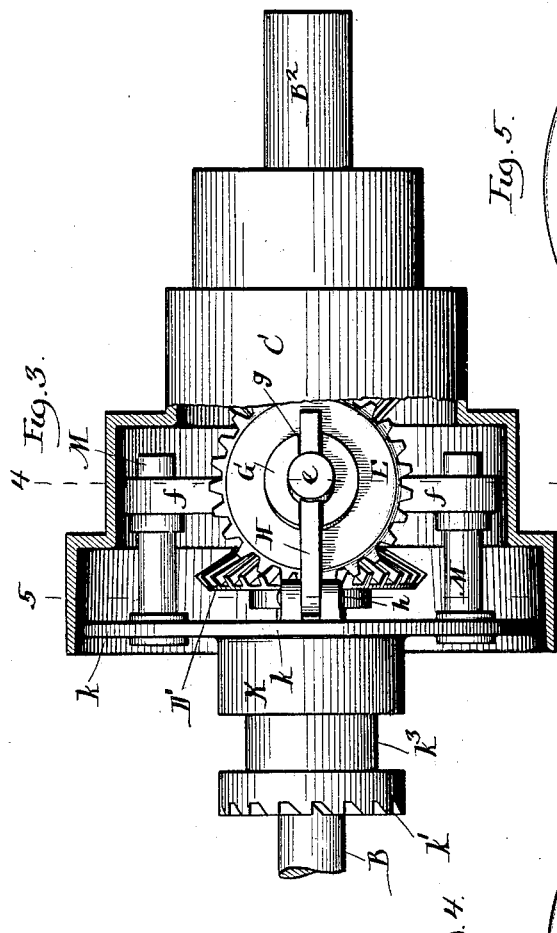
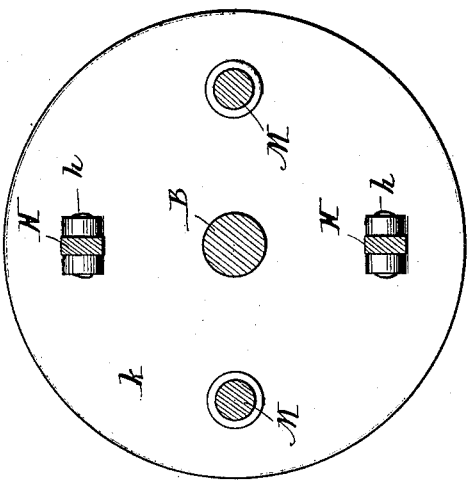
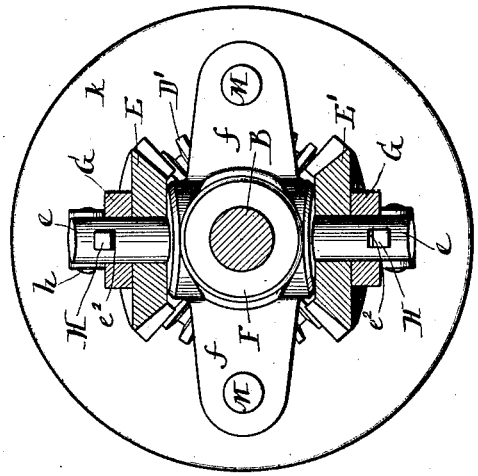
Witnesses:
Inventor:
C. H. Blomstrom
By his Attorneys.

UNITED STATES PATENT OFFICE.

CARL H. BLOMSTROM, OF MARQUETTE, MICHIGAN, ASSIGNOR TO THE LAKE SHORE ENGINE WORKS, OF SAME PLACE.

REVERSING-GEAR MECHANISM.

SPECIFICATION forming part of Letters Patent No. 657,056, dated August 28, 1900.

Application filed February 26, 1900. Serial No. 6,469. (No model.)

*To all whom it may concern:*

Be it known that I, CARL H. BLOMSTROM, a resident of Marquette, in the county of Marquette, State of Michigan, have invented certain new and useful Improvements in Reversing-Gear Mechanism, of which the following is a full, clear, and exact description.

My present invention has for its object to provide a simple and effective construction of gear mechanism, whereby the driven part may be caused to move in the same direction as the driving shaft or part or in opposite direction or may be brought to an idle position while the driving part is still in operation.

The invention consists in the features of improvement hereinafter described, illustrated in the accompanying drawings, and particularly defined in the claims at the end of this specification.

Figure 1 is a view, partly in side elevation and partly in vertical section, of gear mechanism embodying my invention. Fig. 2 is a view in central vertical longitudinal section, parts being shown in elevation. Fig. 3 is a detail plan view of the gear mechanism, the differential-pulley casing being partly broken away. Fig. 4 is a view in vertical cross-section on line 4 4 of Fig. 3, the pulley-casing being omitted. Fig. 5 is a detail view, in vertical section, on line 5 5 of Fig. 3, the casing being omitted.

In the accompanying drawings I have shown my improved gear mechanism as applied for imparting rotation from a drive-shaft to a differential pulley; but it is manifest that the invention may be applied for imparting movement to other driven parts than pulleys, and I do not wish the invention to be understood as restricted to the precise details of construction hereinafter described, since manifestly these may be varied by the skilled mechanic without departure from the spirit of the invention.

A designates a hanger, the dependent arms $a$ of which are provided at their lower ends with suitable bearings wherein are mounted the journal-sleeves $a^2$ and $a^3$. As shown, these sleeves $a^2$ and $a^3$ are held in place within the lower bearing portions of the arms $a$ by means of pointed pins $a^4$ and set-screws $a^5$. In the sleeves $a^2$ and $a^3$ are journaled the ends of the main shaft B, one end of this shaft being shown as provided with a drive-pulley B', while the opposite end of the shaft is shown as mounted within a long sleeve $B^2$, that is journaled in the journal-sleeves $a^2$. Upon the sleeve $B^2$ is keyed the differential pulley C, the exterior of which is shown as formed with a series of stepped surfaces to receive a suitable belt by which motion will be communicated from the pulley C to the machinery to be driven. One end of the pulley C bears against the flanged inner end of the journal-sleeve $a^2$, and, as shown, the pulley C is formed with a hub $c$, on which is keyed the bevel gear-wheel D. Upon the drive-shaft B is keyed a similar bevel gear-wheel D', and these bevel gear-wheels D and D' are connected together by coupling-gears E and E', two of such gears being preferably used. As shown, the gear-wheel D upon the driven pulley C is smaller in diameter than the gear-wheel D' upon the drive-shaft B, the purpose of this arrangement being to impart a comparatively-slow movement in forward direction to the pulley C, while securing a much more rapid reverse or backward movement of the pulley C. This, while not essential to the broad features of my invention, will be found particularly advantageous in driving certain machines—such, for example, as lathes and planes—where a comparatively-slow forward movement and a much more rapid return movement is desired.

Between the gears D D' and E E' and loosely mounted upon the drive-shaft B is the hub or support F, from which project the short axles $e$ and $e'$, on which coupling-gears E and E' are mounted in manner free to revolve and to move in axial direction. Outside of the coupling-gears E E' and loosely encircling the axles $e$ $e'$ are the washers G and G', these washers being formed each with a transverse slot $g$ to admit the shifting arm H, that extends through a transverse slot $e^2$ in each of the axles $e$ and $e'$. Each of the arms H is shown as wedge-shaped and is pivotally connected at $h$ to a disk or lateral extension $k$ of a clutch-sleeve K, that is mounted upon the main drive-shaft B. This clutch-sleeve K has its outer end formed with suitable teeth $k'$, adapted to engage corresponding teeth $k^2$, formed upon the flanged inner end of the journal-sleeve $a^3$. The sleeve K is shown as formed with a peripheral groove $k^3$ to receive a ring $k^4$, that is shown as suspended by the shifter-lever $k^5$, the upper end of which lever being pivoted, as at $a^5$, to the hanger A. The shifter-lever $k^5$ is provided with a laterally and upwardly curved arm $k^7$, that pivotally engages one of the trunnion-pins $k^6$ of the sleeve $k^4$, it being understood, of course, that a similar pin at the opposite side will engage the body of the shifter-lever $k^5$. This particular construction of shifter-lever forms no part of the present invention and being familiar need not be more fully described.

By reference more particularly to Figs. 1, 3, and 4 of the drawings it will be seen that the hub F is provided with the lateral arms or extensions $f$, formed with holes therein, through which pass in manner free to slide the rods M, that project inwardly from the lateral disk or extension $k$ of the coupling-sleeve K, the purpose of these rods M being to enable the locking of the coupling-sleeve K to correspondingly lock the hub or support F against revolution.

From the foregoing description the operation of my improved gear mechanism will be seen to be as follows, viz: Let it be assumed that by means of the shifting-lever $k^5$ the coupling-sleeve K has been moved to its extreme inward position. (Shown in Figs. 1 and 2 of the drawings.) In being thus moved inward the coupling-sleeve has caused the wedge-shaped arms H, through the medium of the washers G, to force the coupling-gears E and E' into firm bearing against the hub or support F, so that these coupling-gears are held against revolution upon their axles $e$ and $e'$. With the parts in this position it will be seen that if revolution is imparted to the drive-shaft B corresponding revolution in like direction will be imparted to the pulley C, because at such time the gear-wheel D is locked to the gear-wheel D' by means of the coupling-gears E and E', and consequently the hub F and the gear-wheels D D' and E E', and as well also the coupling-sleeve K, revolve bodily with the main drive-shaft B. If now it is desired to reverse the direction of travel of the pulley C, the operator by means of the shifting-lever $k^5$ will move outward the coupling-sleeve K until its clutch-teeth $k'$ are in engagement with the clutch-teeth $k^2$ at the inner end of the journal-sleeve $a^3$. This outward movement of the clutch-sleeve K will not only serve to lock this sleeve against revolution, thereby preventing further revolution of the hub or support F, but the outward movement of the clutch-sleeve K will withdraw the wedge-shaped arms H, so as to relieve the bearing of the coupling-gears E E' upon the hub or support F, thereby allowing these coupling-gears E and E' to revolve upon their individual axles $e$ and $e'$. The revolution of the main drive-shaft B will then impart revolution to the coupling-gears E and E', and through the medium of these gears revolution will be imparted to the gear-wheel D and to the pulley C, it being seen, of course, that the direction of revolution thus given to the pulley C will be opposite that of the main drive-shaft B. Inasmuch as the gear-wheel D' is of larger diameter than the gear-wheel D, it is manifest that a materially-increased speed of backward revolution will be given to the pulley C. When it is desired to arrest the revolution of the pulley C without stopping the drive-shaft B, it is only necessary for the operator to so far shift the coupling-sleeve K as to release the coupling-gears E and E' from locking engagement with the hub or support F without moving this coupling-sleeve far enough to cause it to interlock with the clutch-teeth of the journal-sleeve $a^3$. With the parts in such intermediate or neutral position it is obvious that when revolution is imparted to the main drive-shaft and to its gear-wheel D' corresponding revolution will be given to the coupling-gears E and E', which at such time will be free to revolve about their individual axles $e$ and $e'$; but these coupling-gears E and E' will at such time have an orbital movement around the gear-wheel D, as the hub or support F will not be locked against revolution. Hence it will be seen that the pulley C will remain at rest while revolution is imparted to the drive-shaft B.

Having thus described my invention, what I claim as new, and desire to secure by Letters Patent, is—

1. A gear mechanism for uniting a driving shaft or part and a driven part comprising a beveled gear united to the driving shaft or part, a beveled gear of smaller diameter united to the driven part, a coupling-gear connecting said beveled gears, a hub or support having an inclined axle for said coupling-gear and means for connecting and disconnecting said coupling-gear and said hub.

2. A gear mechanism for uniting a driving shaft or part and a driven part, comprising a beveled gear united to the driving shaft or part, a beveled gear of smaller diameter united to the driven part, a coupling-gear connecting said beveled gears, a hub or support for said coupling, means for connecting and disconnecting said coupling-gear and said hub and means for holding said hub or support against revolution when the coupling-gear is free to revolve.

3. A gear mechanism for uniting a driving shaft or part and a driven part, comprising a beveled gear united to said driving shaft or part, a beveled gear united to the driven part, a coupling-gear connecting said beveled gears, a hub or support for said coupling-gear and whereon said coupling-gear is axially movable, a wedge for effecting the locking of said coupling-gear to the hub or support, and means for shifting said wedge.

4. A gear mechanism for uniting a driving shaft or part and a driven part, comprising a beveled gear united to said driving shaft or part, a beveled gear united to the driven part, a coupling-gear connecting said beveled gears, a hub or support for said coupling-gear and whereon said coupling-gear is axially movable, a wedge for effecting the locking of said coupling-gear to the hub or support, a revoluble sleeve to which said wedge is connected and means for shifting said sleeve.

5. A gear mechanism for uniting a driving shaft or part and a driven part, comprising a beveled gear united to said driving shaft or part, a beveled gear united to the driven part, a coupling-gear connecting said beveled gears, a hub or support for said coupling-gear and whereon said coupling-gear is axially movable, a wedge for effecting the locking of said coupling-gear to the hub or support, a revoluble sleeve whereby said wedge is shifted, a clutch for holding said revoluble sleeve against revolution and means for shifting said sleeve into and out of engagement with said clutch.

6. A gear mechanism for uniting a driving shaft or part and a driven part, comprising a beveled gear united to the driving shaft or part, a beveled gear united to the driven part, a beveled coupling-gear connecting said beveled gears, a hub or support provided with a slotted axle whereon said coupling-gear is mounted in manner free to slide, a wedge-shaped arm passing through said slotted axle and arranged to lock said coupling-gear to said hub or support, and means for shifting said wedge-shaped arm to lock or free said coupling-gear.

7. A gear mechanism for uniting a driving shaft or part and a driven part, comprising a gear-wheel united to the driving shaft or part, a gear-wheel united to the driven part, two oppositely-disposed coupling-gears connecting said above-mentioned gears, a hub or support interposed between said coupling-gears and whereby said coupling-gears are pivotally sustained, movable wedges for moving said coupling-gears axially to lock them in said hub or support and shifting mechanism to which said wedges or cams are connected and whereby they are operated.

8. A gear mechanism for uniting a driving shaft or part and a driven part, comprising a gear-wheel united to the driving shaft or part, a gear-wheel united to the driven part, two oppositely-disposed coupling-gears connecting said above-mentioned gears, a hub or support interposed between said coupling-gears and whereby said coupling-gears are pivotally sustained, movable wedges for moving said coupling-gears axially to lock them in said hub or support, shifting mechanism to which said wedges are connected and whereby they are operated, said shifting mechanism comprising a clutch-sleeve connected to said wedges or cams and also connected to said hub or support, and a clutch for arresting the movement of said clutch-sleeve.

9. A gear mechanism for uniting a driving shaft or part and a driven part, comprising a gear-wheel united to the driving shaft or part, a gear-wheel united to the driven part, a coupling-gear connecting said above-mentioned gears, a hub interposed between said above-mentioned gears and whereon said coupling-gear is mounted, a drive-shaft to which one of said gears is keyed, a revoluble sleeve or part to which the other of said gears is keyed, a hollow pulley mounted upon said sleeve and inclosing said gears and means for connecting and disconnecting said coupling-gear and said hub or support.

10. In apparatus of the character described, the combination of a main drive-shaft, a beveled gear-wheel keyed to said shaft, a sleeve mounted upon said shaft, a pulley mounted on said sleeve, a beveled gear-wheel keyed to said pulley, a coupling-gear connecting said above-mentioned beveled gears, a hub mounted upon said drive-shaft and arranged between said gears, an axle carried by said hub and whereon said coupling-gear is mounted in manner free to move in axial direction, a wedge-shaped arm for connecting and disconnecting said coupling-gear and said hub or support, a clutch-sleeve provided with an extension to which said wedge-shaped arm is attached, said extension being suitably connected with said hub or support, and means for shifting said clutch-sleeve and arrest its movement.

CARL H. BLOMSTROM.

Witnesses:
FRED H. BEGOLE,
J. FRED KERN.